(12) United States Patent
Xing et al.

(10) Patent No.: US 10,467,794 B2
(45) Date of Patent: Nov. 5, 2019

(54) TECHNIQUES FOR GENERATING DYNAMIC EFFECTS ANIMATIONS

(71) Applicant: AUTODESK, INC., San Rafael, CA (US)

(72) Inventors: Jun Xing, Toronto (CA); Rubaiat Habib Kazi, Toronto (CA); Tovi Grossman, Toronto (CA); Li-Yi Wei, Toronto (CA); Jos Stam, Toronto (CA); George Fitzmaurice, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 4 days.

(21) Appl. No.: 15/441,224

(22) Filed: Feb. 23, 2017

(65) Prior Publication Data

US 2018/0082460 A1  Mar. 22, 2018

Related U.S. Application Data

(60) Provisional application No. 62/398,445, filed on Sep. 22, 2016.

(51) Int. Cl.
*G06T 13/80* (2011.01)

(52) U.S. Cl.
CPC .......... *G06T 13/80* (2013.01); *G06T 2210/56* (2013.01)

(58) Field of Classification Search
CPC ..................................................... G06T 13/80
USPC ........................................................ 345/474
See application file for complete search history.

(56) References Cited

U.S. PATENT DOCUMENTS

| 2007/0085851 A1* | 4/2007 | Muller | G06T 13/20 345/474 |
| 2009/0171596 A1* | 7/2009 | Houston | G01P 5/001 702/45 |
| 2017/0024922 A1* | 1/2017 | Angelidis | G06T 13/60 |

OTHER PUBLICATIONS

Barnat, A., Li, Z., McCann, J., & Pollard, N. S. (May 2011). Mid-level smoke control for 2D animation. In Proceedings of Graphics Interface 2011 (pp. 25-32). Canadian Human-Computer Communications Society.

(Continued)

*Primary Examiner* — Hai Tao Sun
(74) *Attorney, Agent, or Firm* — Artegis Law Group, LLP (57) ABSTRACT

In one embodiment, a dynamic effects subsystem automatically generates a dynamic effects animation. A graphical user interface enables an animator to sketch applied energies that influence graphical objects. Each applied energy includes flow particles that are associated with velocity fields. Over time, a dynamic effects engine moves the flow particles and the associated velocity fields along a overall direction associated with the applied energy. To generate each frame included in the dynamic effects animation, the dynamic effect engine computes samples of the graphical objects, computes the influences of the velocity fields on the samples, and updates the positions of the samples based on the influences of the velocity fields. Notably, the applied energies and the flow particles enable the animator to effectively and interactively control the automated animation operations of the dynamic effects engine. Consequently, the resulting dynamic effects animation meets artistic, performance, and physical accuracy goals.

22 Claims, 6 Drawing Sheets

(56) References Cited

OTHER PUBLICATIONS

Davis, R. C., Colwell, B., & Landay, J. A. (Apr. 2008). K-sketch: a 'kinetic' sketch pad for novice animators. In Proceedings of the SIGCHI Conference on Human Factors in Computing Systems (pp. 413-422).
Fattal, R., & Lischinski, D. (Aug. 2004). Targetdriven smoke animation. In ACM Transactions on Graphics (TOG) (vol. 23, No. 3, pp. 441-448).
Fedkiw, R., Stam, J., & Jensen, H. W. (Aug. 2001). Visual simulation of smoke. In Proceedings of the 28th annual conference on Computer graphics and interactive techniques (pp. 15-22). ACM.
Gilland, J. 2012. Elemental Magic, vol. 2: The Technique of Special Effects Animation (Animation Masters Title). Focal Press.
Guay, M., Ronfard, R., Gleicher, M., & Cani, M. P. (Jun. 2015). Adding dynamics to sketch-based character animations. In Proceedings of the workshop on Sketch-Based Interfaces and Modeling (pp. 27-34). Eurographics Association.
Igarashi, T., Moscovich, T., & Hughes, J. F. (2005). Asrigid-aspossible shape manipulation. ACM transactions on Graphics (TOG), 24(3), 1134-1141.
Kazi, R. H., Chevalier, F., Grossman, T., Zhao, S., & Fitzmaurice, G. (Apr. 2014). Draco: bringing life to illustrations with kinetic textures. In Proceedings of the SIGCHI Conference on Human Factors in Computing Systems (pp. 351-360).
Kazi, R. H., Grossman, T., Umetani, N., Fitzmaurice, G. 2016. Skuid: Sketching Dynamic Illustrations Using the Principles of 2D Animation. In CHI '16.
Kim, T., Thürey, N., James, D., & Gross, M. (Aug. 2008). Wavelet turbulence for fluid simulation. In ACM Transactions on Graphics (TOG) (vol. 27, No. 3, p. 50).
Ladický, L., Jeong, S., Solenthaler, B., Pollefeys, M., & Gross, M. (2015). Data-driven fluid simulations using regression forests. ACM Transactions on Graphics (TOG), 34(6), 199.
Lu, J., Barnes, C., DiVerdi, S., & Finkelstein, A. (2013). Realbrush: Painting with examples of physical media. ACM Transactions on Graphics (TOG), 32(4), 117.
Ma, C., Wei, L. Y., Guo, B., & Zhou, K. (Dec. 2009). Motion field texture synthesis. In ACM Transactions on Graphics (TOG) (vol. 28, No. 5, p. 110).
Müller, M., Chentanez, N., & Kim, T. Y. (2013). Real time dynamic fracture with volumetric approximate convex decompositions. ACM Transactions on Graphics (TOG), 32(4), 115.
Popović, J., Seitz, S. M., Erdmann, M., Popović, Z., & Witkin, A. (Jul. 2000). Interactive manipulation of rigid body simulations. In Proceedings of the 27th annual conference on Computer graphics and interactive techniques (pp. 209-217).
Santosa, S., Chevalier, F., Balakrishnan, R., & Singh, K. (Apr. 2013). Direct space-time trajectory control for visual media editing. In Proceedings of the SIGCHI Conference on Human Factors in Computing Systems (pp. 1149-1158).
Selle, A., Rasmussen, N., & Fedkiw, R. (Jul. 2005). A vortex particle method for smoke, water and explosions. In ACM Transactions on Graphics (TOG) (vol. 24, No. 3, pp. 910-914).
Stam, J. (Jul. 1999). Stable fluids. In Proceedings of the 26th annual conference on Computer graphics and interactive techniques (pp. 121-128).
Takeo Igarashi, Satoshi Matsuoka, and Hidehiko Tanaka. 1999. Teddy: a sketching interface for 3D freeform design. In Proceedings of the 26th annual conference on Computer graphics and interactive techniques (SIGGRAPH '99), 409-416.
Thorne, M., Burke, D., & van de Panne, M. (2004). Motion Doodles: An Interface for Sketching Character Motion. ACM transactions on graphics, (3), 422-429.
Treuille, A., McNamara, A., Popović, Z., & Stam, J. (2003). Keyframe control of smoke simulations. ACM Transactions on Graphics (TOG), 22(3), 716-723.
von Funck, W., Theisel, H., & Seidel, H. P. (Jul. 2006). Vector field based shape deformations. In ACM Transactions on Graphics (TOG) (vol. 25, No. 3, pp. 1118-1125).
King, J., Chen, H. T., & Wei, L. Y. (2014). Autocomplete painting repetitions. ACM Transactions on Graphics (TOG), 33(6), 172.
Yang, T., Chang, J., Ren, B., Lin, M. C., Zhang, J. J., & Hu, S. M. (2015). Fast multiple-fluid simulation using p. 12 of 10 Helmholtz free energy. ACM Transactions on Graphics (TOG), 34(6), 2015.
Yuksel, C., House, D. H., & Keyser, J. (Aug. 2007). Wave particles. InACM Transactions on Graphics (TOG) (vol. 26, No. 3, p. 99).

\* cited by examiner

TECHNIQUES FOR GENERATING DYNAMIC EFFECTS ANIMATIONS

CROSS-REFERENCE TO RELATED APPLICATIONS

This application claims the priority benefit of the U.S. Provisional patent application having Ser. No. 62/398,445 and filed on Sep. 22, 2016. The subject matter of this related application is hereby incorporated herein by reference.

BACKGROUND OF THE INVENTION

Field of the Invention

Embodiments of the present invention relate generally to computer processing and, more specifically, to techniques for generating dynamic effects animations.

Description of the Related Art

As part of generating an illusion of motion or change for two-dimensional (2D) graphical objects, an animator often generates a "dynamic effects animation." Such an animation is a sequence of frames that visually conveys passive and secondary visual effects that are driven by underling forces that change over time. For example, a dynamic effects animation for wind-blown hair could be a sequence of frames that depicts distortions in hair that result from the underlying forces exerted by the wind on the hair over time. In another example, a dynamic effects animation for a splash could be a sequence of frames that depicts distortions in water that result from the underlying forces exerted by a rock on the water over time.

One approach to generating a dynamic effects animation is "key framing." In key framing, the animator sketches a sequence of "key frames," where each key frame depicts the appearance of 2D graphical objects at a starting and/or ending point of a smooth transition. Viewing the key frames in succession conveys the impression that the 2D graphical objects are moving and/or changing over time. The animator typically sketches each of the key frames manually and, consequently, is able to exert complete artistic control over the dynamic effects animation. However, because key framing is a manual process, key framing may be unacceptably time consuming and tedious. Further, producing a realistic dynamic effects animation via key framing requires both artistic expertise and knowledge of dynamic effects. Therefore, key framing is not accessible to many users.

To reduce the time required to generate a dynamic effects animation, an animator may generate a dynamic effects animation via physical simulation tools. The animator creates 2D graphical objects, specifies the initial positions of the 2D graphical objects, and specifies initial underlying forces via the physical simulation tools. The animator then configures the physical simulation tools to execute a simulation that realistically modifies the appearance of the 2D graphical objects based on the evolution of the underlying forces over time. One drawback to using physical simulation tools, however, is that animators are oftentimes unable to understand and control how the physical simulation tools cause the appearance of the 2D graphical objects to evolve. Consequently, dynamic effects animations generated via physical simulation tools do not always meet the artistic goals of the animator. For example, an animator may be unable to configure the physical simulation tools to generate a dynamic effects animation that depicts wind-blown hair in a desired fashion.

As the foregoing illustrates, what is needed in the art are more effective techniques for generating dynamic effects animations.

SUMMARY OF THE INVENTION

One embodiment of the present invention sets forth a computer-implemented method for generating a dynamic effects animation. The method includes computing a first velocity field for a first flow particle based on an applied energy; computing a first velocity of a first sample included within a first graphical object based on the first velocity field and a position of the first sample, where the first graphical object is included in a first frame; updating the position of the first sample based on the first velocity to generate a second graphical object; and generating a second frame that includes the second graphical object.

One advantage of the disclosed techniques is that the techniques provide artistic control while reducing the time and expertise required to generate dynamic effects animations. In particular, because the graphical objects are updated automatically based on the flow particles, the time and expertise required to produce a realistic dynamic effects animation is dramatically less than the time and expertise that would be required to perform key framing.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
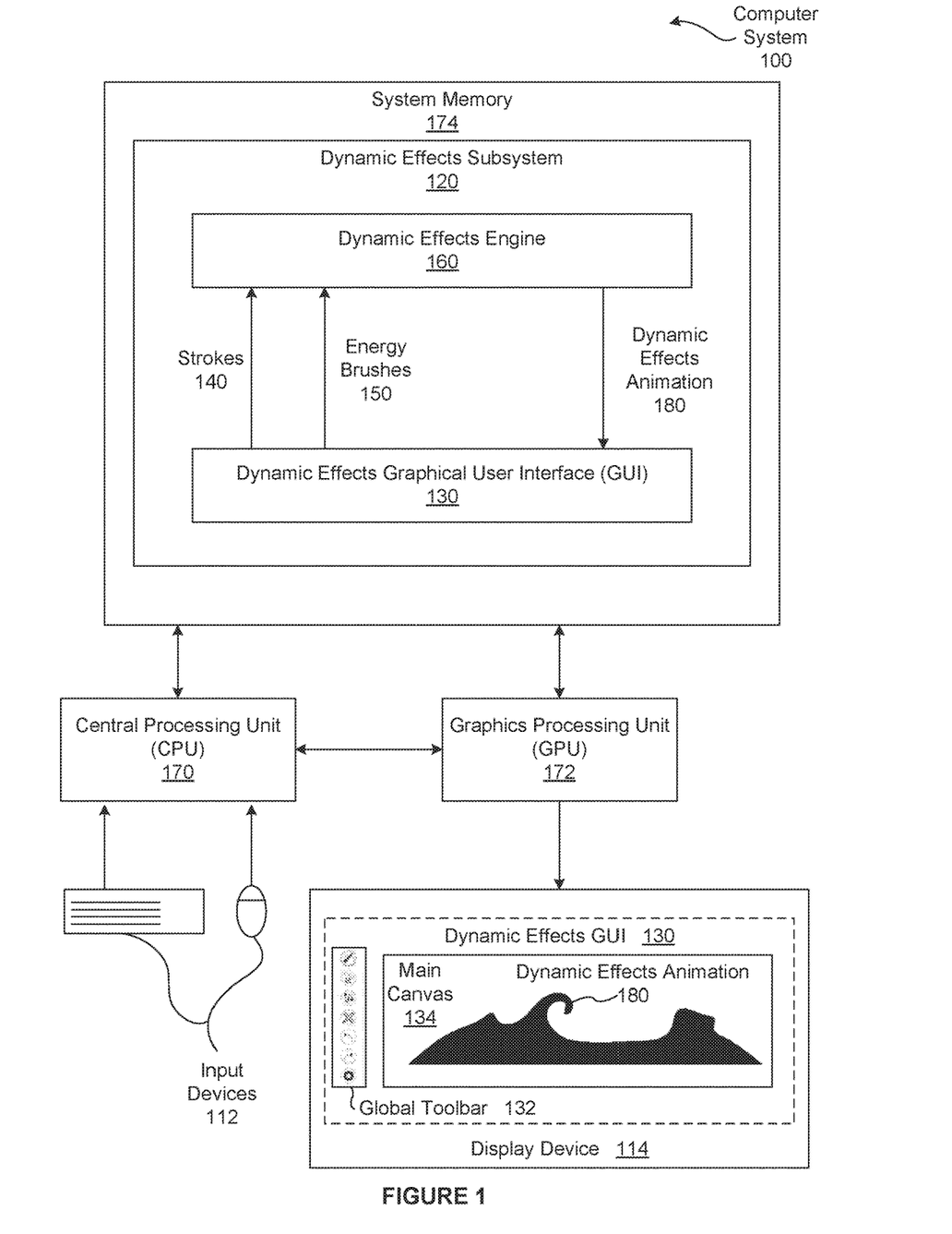
FIG. 1 is a conceptual illustration of a computer system configured to implement one or more aspects of the present invention.

FIG. 1 is a conceptual illustration of a computer system 100 configured to implement one or more aspects of the present invention. As shown, the computer system 100 includes, without limitation, a central processing unit (CPU) 170, input devices 112, a graphics processing unit (GPU) 172, a display device 114, and a system memory 174. For explanatory purposes, multiple instances of like objects are denoted with reference numbers identifying the object and parenthetical numbers identifying the instance where needed.

The CPU 170 receives user input from the input devices 112, such as a keyboard or a mouse. In operation, the CPU 170 is the master processor of the computer system 100, controlling and coordinating operations of other system components. In particular, the CPU 170 issues commands that control the operation of the GPU 172. The GPU 172 incorporates circuitry optimized for graphics and video processing, including, for example, video output circuitry. The GPU 172 delivers pixels to the display device 114 that may be any conventional cathode ray tube, liquid crystal display, light-emitting diode display, or the like.

In various embodiments, the GPU 172 may be integrated with one or more of other elements of FIG. 1 to form a single system. For example, the GPU 172 may be integrated with the CPU 170 and other connection circuitry on a single chip to form a system on chip (SoC). In alternate embodiments, the CPU 170 and/or the GPU 172 may be replaced with any number of processors. Each of the processors may be any instruction execution system, apparatus, or device capable of executing instructions. For example, a processor could comprise a digital signal processor (DSP), a controller, a microcontroller, a state machine, or any combination thereof.

The system memory 174 stores content, such as software applications and data, for use by the CPU 170 and the GPU 172. The system memory 174 may be any type of memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) may supplement or replace the memory 174. The storage may include any number and type of external memories that are accessible to the CPU 170 and/or the GPU 172. For example, and without limitation, the storage may include a Secure Digital Card, an external Flash memory, a portable compact disc read-only memory (CD-ROM), an optical storage device, a magnetic storage device, or any suitable combination of the foregoing.

It will be appreciated that the computer system 100 shown herein is illustrative and that variations and modifications are possible. The number of CPUs 170, the number of GPUs 172, the number of system memories 174, and the number of applications included in the system memory 174 may be modified as desired. Further, the connection topology between the various units in FIG. 1 may be modified as desired. In some embodiments, any combination of the CPU 170, the GPU 172, and the system memory 174 may be replaced with any type of distributed computer system or cloud computing environment, such as a public or a hybrid cloud.

In general, the computer system 100 is configured to generate a dynamic effects animation 180 based on input data received from an animator via the input devices 112. As referred to herein, the dynamic effects animation 180 is a sequence of frames that visually conveys passive and secondary visual effects that are driven by underlying forces that change over time. The dynamic effects are manifested as distortions in strokes 140. As referred to herein, each of the strokes 140 is a visual representation of any visible portion of a two-dimension (2D) graphical object. Each of the strokes 140 may represent a hand-drawn line, a hand-drawn shape, an imported texture, a region filled with color, and the like.

For example, the dynamic effects animation 180 for wind-blown hair could be a sequence of frames that depicts distortions in hair that result from the underlying forces exerted by the wind on the hair over time. In another example, the dynamic effects animation 180 for a splash could be a sequence of frames that depicts distortions in water that result from the underlying forces exerted by a rock on the water over time.

One conventional approach to generating a dynamic effects animation is "key framing." In key framing, the animator sketches a sequence of "key frames," where each key frame depicts the appearance of strokes at a starting and/or ending point of a smooth transition. Viewing the key frames in succession conveys the impression that the strokes are moving and/or changing over time. The animator typically sketches each of the key frames manually and, consequently, is able to exert complete artistic control over the dynamic effects animation. However, because key framing is a manual process, key framing may be unacceptably time consuming. Further, producing a realistic dynamic effects animation via key framing typically requires both artistic expertise and knowledge of dynamic effects. Therefore, key framing is not accessible to many users.

To reduce the time required to generate a dynamic effects animation, an animator may generate a dynamic effects animation via physical simulation tools. The animator creates strokes, specifies the initial positions of the strokes, and specifies initial underlying forces via the physical simulation tools. The animator then configures the physical simulation tools to execute a simulation that realistically modifies the appearance of the strokes based on the evolution of the underlying forces over time. One drawback to using physical simulation tools, however, is that animators are oftentimes unable to understand and control how the physical simulation tools cause the appearance of the strokes to evolve. Consequently, dynamic effects animations generated via physical simulation tools do not always meet the artistic goals of the animator. For example, an animator may be unable to configure the physical simulation tools to generate a dynamic effects animation that depicts wind-blown hair in a desired fashion.

Increasing Artistic Control while Maintaining Realism and Performance

To increase the artistic control that may be exerted by an animator over the dynamic effects animation 180 while maintaining the realism and performance that is associated with physical simulation tools, the system memory 174 includes, without limitation, a dynamic effects subsystem 120. As shown, the dynamic effects subsystem 120 includes, without limitation, a dynamic effects engine 160 and a dynamic effects graphical user interface (GUI) 130.

The dynamic effects engine 160 comprises a software program that generally resides with the system memory 174 and is executed by the CPU 170. The dynamic effects engine 160 generates the dynamic effects GUI 130 and receives input data from the animator via the input devices 112. The dynamic effects engine 160 then performs animation operations based on the input data and updates the dynamic effects GUI 130 to display the dynamic effects animation 180. As part of generating and updating the dynamic effects GUI 130, the dynamic effects engine 160 may perform any number and type of operations that directly or indirectly configure any number and type of the display devices 114. As a general matter, as the dynamic effects engine 160 receives input data, the dynamic effects engine 160 dynamically performs automated animation operations and/or updates the dynamic effects GUI 130. Accordingly, the dynamic effects engine 160 and the dynamic effects GUI 130 facilitate a interactive design process.

As shown, the dynamic effects GUI 130 includes, without limitation, a global toolbar 132 and a main canvas 134. The global toolbar 132 includes, without limitation, design tools for specifying the strokes 140, design tools for specifying dynamic applied energies, and animation tools for generating the dynamic effects animation 180. The main canvas 134 enables the animator to sketch the strokes 140, sketch the dynamic applied energies, and view the resulting dynamic effects animation 180. In general, the dynamic effects GUI 130 may include any number of display widgets that enable the animator to specify the strokes 140 and the dynamic applied energies that deform the strokes 140 over time. Further, the dynamic effects GUI 130 may include any number of display widgets that enable the animator to configure any number and type of parameters, constraints, and/or preferences that influence the dynamic effects animation 180.

Each of the strokes 140 includes a set of points (not shown). The set of points may represent any portion of a 2D graphical object in any technically feasible fashion. For example, a set of points could represent a polygonal line, a closed shape outline, a solid filled region, an imported and triangulated texture, and so forth. The animator specifies the strokes 140 via the dynamic effects GUI 130. For example, the animator could sketch a series of waves in the main canvas 134.

To enable the animator to specify the dynamic applied energies in an intuitive manner, the dynamic effects GUI 130 provides mechanisms for entering energy brushes 150. Each of the energy brushes 150 defines the overall direction of an applied energy and continuously emits flow particles (not shown in FIG. 1). Each flow particle is associated with an energy pattern that is represented as a velocity field surrounding and centered at the flow particle. In this fashion, each of the energy brushes 150 specifies a stable, repetitive velocity field pattern.

To specify the energy brush 150, the animator sketches the energy brush 150 in the overall direction of an applied energy via the main canvas 134. Further, the animator configures the energy brush 150 via a flow particle type (not shown in FIG. 1) to continuously emit flow particles with a velocity pattern that is associated with the flow particle type. More specifically, the dynamic effects GUI 130 enables the animator to configure the energy brush 150 to emit "wind," "swirl," or "smoke" flow particles that correspond to natural energy sources. In various embodiments, the dynamic effects GUI 130 provides tools that enable the animator to design customized flow particle types that may vary the velocity patterns of the associated flow particles based on time. In alternate embodiments, the dynamic effects GUI 130 and the dynamic effects engine 160 may support any number of predefined, customized, and/or time-varying flow particle types in any combination.

To generate and display the dynamic effects animation 180, the dynamic effects engine 160 moves the flow particles along the trajectories specified by the associated energy brushes 150. The dynamic effects engine 160 deforms the strokes 140 that lie within the velocity fields that are associated with the flow particles to reflect the influences of the applied energies. In this fashion, the dynamic effects animation 180 reflects first-order effects of the velocity fields that are generated based on the input data received from the animator. Accordingly, the animator may interact with the dynamic effects GUI 130 to understand and exert substantial artistic control over the dynamic effects animation 180.

Advantageously, the animator may specify any number of energy brushes 150 that emit any number and type of flow particles. To compute the dynamic effects animation 180, the dynamic effects engine 160 sums the influences of all the velocity fields on the strokes 140. Consequently, the animator may generate a resulting dynamic effects animation 180 that illustrates complex dynamic effects. Note that to avoid infinite loops, the dynamic effects engine 160 does not compute the influence of a given velocity field on the other velocity fields. Further, to prevent collisions, the velocity fields are incompressible (divergence-free).

Note that the techniques described herein are illustrative rather than restrictive, and may be altered without departing from the broader spirit and scope of the invention. Many modifications and variations on the functionality provided by the dynamic effects subsystem 120, the dynamic effects engine 160, and the dynamic effects GUI 130 will be apparent to those of ordinary skill in the art without departing from the scope and spirit of the described embodiments.

In particular, in some embodiments, the dynamic effects subsystem 120, the dynamic effects engine 160, and the dynamic effects GUI 130 may be modified to generate three dimensional (3D) dynamic effects animations based on 3D graphical objects. For example, the dynamic effects GUI 130 could represent 3D strokes as meshes, and provide augmented reality or virtual reality mechanisms for entering 3D energy brushes that specify velocity field patterns. To generate a 3D dynamics effects animation, the dynamic effects engine 160 could deform the 3D strokes that lie within the velocity fields to reflect the influences of the applied energies based on variations of the 2D techniques described herein.

In various embodiments, any number of the techniques may be implemented while other techniques may be omitted in any technically feasible fashion that generates the dynamic effect animation 180 based on applying the energy brushes 150 to the strokes 140. For instance, in some embodiments, the dynamic effects GUI 130 may include a layer panel and a motion scripting tool. The layer panel allows the animator to create and animate the strokes 140 in different layers, where the different layers are independent of each other. The motion scripting tool enables the animator to record a translation path that the dynamic effects engine 160 applies to all the strokes 140 and all the energy brushes 150 included in the corresponding layer.

In alternate embodiments, the system memory 174 may not include the dynamic effects subsystem 120. Further, the dynamic effects subsystem 120 may not include the dynamic effects engine 160 and/or the dynamic effects GUI 130. In some embodiments, any number of the dynamic effects subsystem 120, the dynamic effects engine 160, and the dynamic effects GUI 130 may be stored on computer readable media such as a CD-ROM, DVD-ROM, flash memory module, or other tangible storage media. Further, in some embodiments, the dynamic effects engine 160 and/or the dynamic effects GUI 130 may be provided as an application program (or programs) stored on computer readable media such as a CD-ROM, DVD-ROM, flash memory module, or other tangible storage media. In various embodiments, the functionality of the dynamic effects engine 160 and the dynamic effects GUI 130 are integrated into or distributed across any number (including one) of software applications.

The components illustrated in the computer system 100 may be included in any type of computer system 100, e.g., desktop computers, server computers, laptop computers, tablet computers, and the like. Additionally, the dynamic effects engine 160 and/or the dynamic effects GUI 130 may execute on distributed systems communicating over computer networks including local area networks or large, wide area networks, such as the Internet. The dynamic effects engine 160 and the dynamic effects GUI 130 described herein are not limited to any particular computing system and may be adapted to take advantage of new computing systems as they become available. In alternate embodiments, the functionality of the dynamic effects subsystem 120, the dynamic effects engine 160, and the dynamic effects GUI 130 may be implemented and provided in any technically feasible. For instance, in some embodiments the functionality of the dynamic effects subsystem 120, the dynamic effects engine 160, and/or the dynamic effects GUI 130 may be provided as a cloud-based service.

Controlling Dynamic Effects Animations

Figure 2:
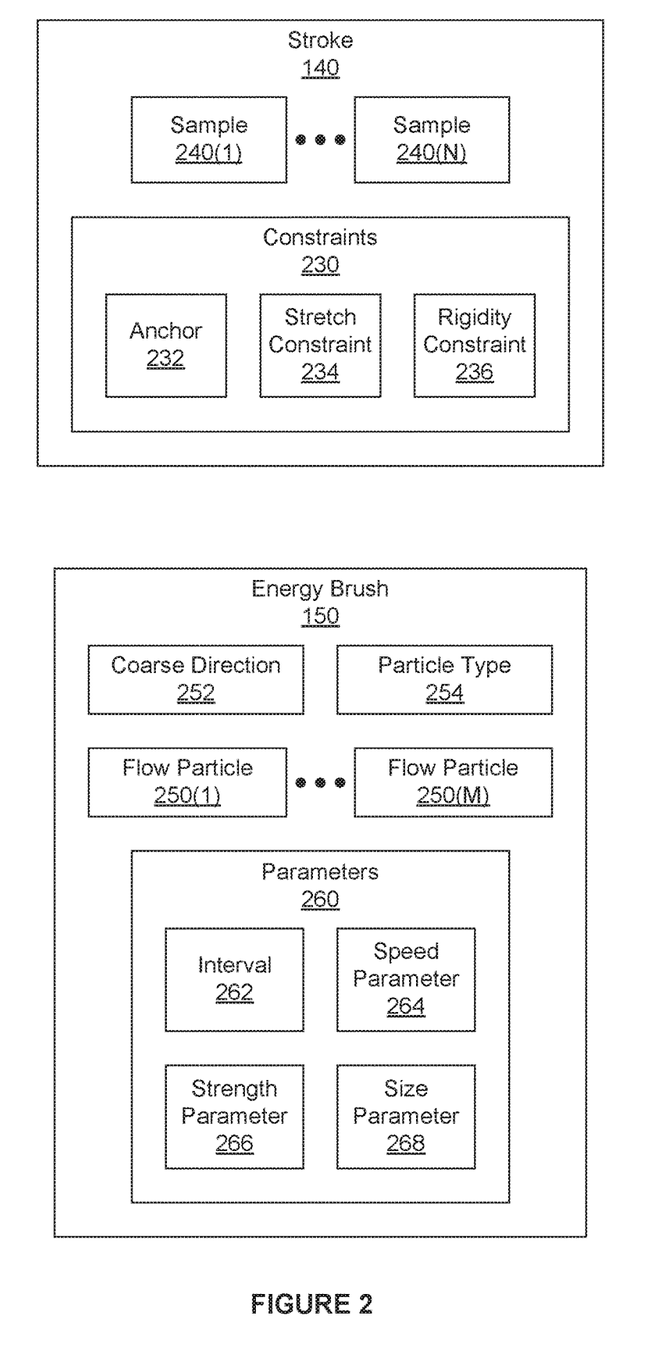
FIG. 2 sets forth more detailed illustrations of the stroke of FIG. 1 and the energy brush, according to various embodiments of the present invention.

FIG. 2 sets forth more detailed illustrations of the stroke 140 of FIG. 1 and the energy brush 150, according to various embodiments of the present invention. In operation, the dynamic effects GUI 130 enables the animator to specify the strokes 140 and the energy brushes 150. Subsequently, the dynamic effects engine 160 performs animation operations that apply the energy brushes 150 to the strokes 140 to generate the dynamic effects animation 180.

As shown, the stroke 140 includes, without limitation, any number of samples 240 and constraints 230. As previously disclosed herein, the stroke 140 is defined by a set of points (not shown) that may be represented in any technically feasible fashion. For example, the stroke 140 could be represented via a mesh that represents vertices, edges, and faces. The dynamic effects engine 160 generates the samples 240 as part of performing animation operations to generate the dynamic effects simulation 180. In operation, the dynamic effects engine 160 samples each stroke based on a sampling distance to determine the number and positions of the samples 240 that are included in the stroke 140. The dynamic effects engine 160 may determine the sampling distance in any technically feasible fashion. For example, the dynamic effects engine 160 could be configured to implement a predetermined sampling distance of 6 pixels.

As persons skilled in the art will recognize, as the dynamic effects engine 160 modifies the stroke 140 to reflect the influence of the energy brushes 150, the distances between adjacent samples 240 may become highly non-uniform. To ensure that the stroke 140 is able to capture the detailed dynamics when the distances between the adjacent samples 240 are larger than the sample distance, the dynamic effects engine 160 performs resampling operations. As a result, the number and/or positions of the samples 240 may vary over time.

As shown, the constraints 230 include, without limitation, any number of anchors 232, stretch constraints 234, and rigidity constraints 236. As a general matter, for each of the samples 240, the dynamic effects engine 160 associates any number (including zero) of the constraints 230 with any number of the samples 240 based on the positions of the samples 240. The anchors 232 specify points included in the stroke 140 that have a fixed position. Consequently, the positions of the samples 240 that are specified as the anchors 232 are not influenced by the energy brushes 150. Each of the stretch constraints 234 discourages length changes between adjacent samples 240. Each of the rigidity constraints 236 discourages changes in the detailed shape of a region that is associated with the rigidity constraint 236.

In addition to enabling the animator to specify the type, position, and/or region associated with each of the constraints 230, the dynamic effects GUI 130 provides mechanisms that allow the animator to specify the strength of the constraints 230. In operation, the dynamic effects engine 160 applies the constraints 230 based on the strengths of the constraints 230. For example, suppose that the animator specified a relatively strong stretch constraint 234 and a relatively strong rigidity constraint 236. The dynamic effects engine 160 would curtail the influence of the energy brushes 150 on the strokes 140 to preserve the local shapes and overall lengths of the strokes 140. In alternate embodiments, the dynamic effects GUI 130 and the dynamic effects engine 160 may enable the animator to configure any number and type of the constraints 230 in any technically feasible fashion and at any level of granularity.

As shown, the energy brush 150 includes, without limitation, a coarse direction 252, a particle type 254, any number of flow particles 250, and parameters 260. The energy brush 150 is also associated with two dimensional (2D) coordinates (not shown) that define the position and size of the energy brush 150. In general, the dynamic effects GUI 130 may provide any number and type of mechanisms that enable the animator to define the coordinates of the energy brush 150. For example, the dynamics effects GUI 130 could provide sketching tools that enable the animator to enter the energy brush 150 via the main canvas 134. The dynamic effects engine 160 may represent the coordinates of the energy brush 150 in any technically feasible fashion that is consistent with the dynamic effects GUI 130.

To generate each frame included in the dynamic effects animation 180, the dynamic effects engine 160 first updates the energy brushes 150 to reflect the movement of the flow particles 250 along the energy brushes 150 over a time step. The time step represents a time different between adjacent frames. The dynamic effects engine 160 may determine the time step in any technically feasible fashion. For instance, in some embodiments, the dynamic effects engine 160 could set the time step to a predetermined constant value of 0.1 seconds. Subsequently, the dynamic effects engine 160 deforms the strokes 140 based on the flow particles 250.

The coarse direction 252 defines the direction of the energy brush 150 and, consequently, the influence of the energy brush 150 on the strokes 140 at a coarse scale. In some embodiments, the dynamic effects engine 160 computes the direction of the energy brush 150 based on the coordinates of the energy brush 150. The particle type 254 defines the pattern of the velocity field (not shown in FIG. 2) that is associated with each of the flow particles 250 included in the energy brush 150. Consequently, the particle type 254 defines the influence of the energy brush 150 on the strokes 140 at a fine scale. The dynamic effects generator GUI 130 may provide any number and type of display widgets that enable the animator to define and/or select the particle type 254 for the energy brush 150.

Over time, a given flow particle 250 is emitted by the energy brush 150, travels along the length of the energy brush 150, and then ceases to exist. Accordingly, the number and position of the flow particles 250 that are included in the energy brush 150 vary over time. The dynamic effects generator GUI 130 provides any number of mechanisms that enable the animator to control and configure the flow particles 250 via the parameters 260. As shown, the parameters 260 include, without limitation, an interval 262, a speed parameter 264, a strength parameter 266, and a size parameter 268.

The interval 262 defines the emission interval at which the dynamic effects engine 160 generates new flow particles 250 that are included in the energy brush 150. The speed parameter 264 defines the velocity with which the dynamic effects engine 160 moves the flow particles 250 along the length of the energy brush 150. For each of the flow particles 250 included in the energy brush 150, the strength parameter 266 defines the strength of the velocity field. Similarly, for each of the flow particles included in the energy brush 150, the size parameter 268 defines the radius of the velocity field.

Notably, by specifying the coarse direction 252, the particle type 254, and the parameters 260, the animator may generate a wide range of chaotic and complex dynamic effects. Further, if the animator generates multiple energy brushes 150, then the dynamic effects engine 150 composes the influences of the individual energy brushes 150 to create emergent phenomena.

Figure 3:
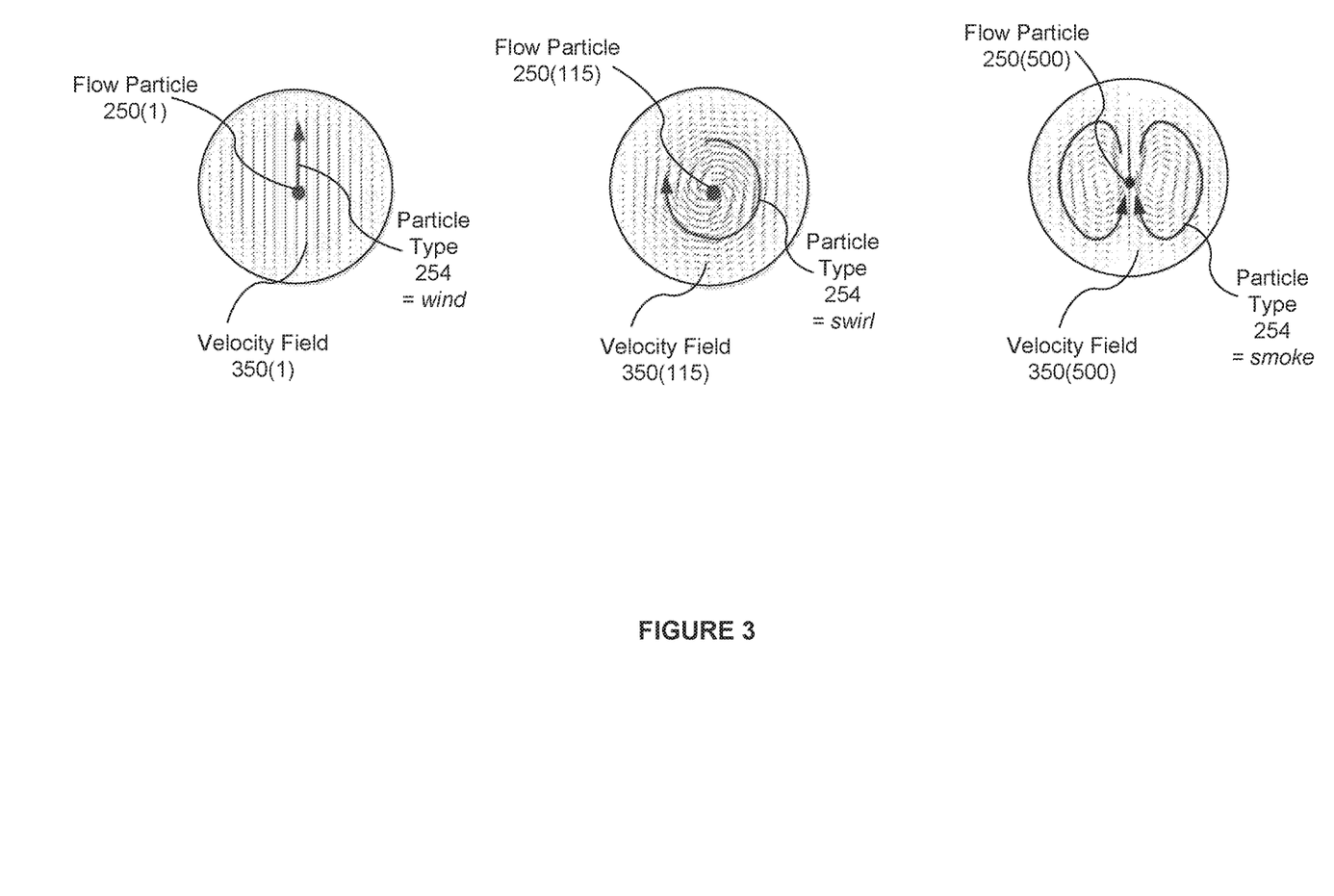
FIG. 3 sets forth exemplary illustrations of different types of flow particles, according to various embodiments of the present invention.

FIG. 3 sets forth exemplary illustrations of different types of the flow particles 250, according to various embodiments of the present invention. As shown, the flow particle 250(1) is associated with the particle type 254 "wind," the flow particle 250(115) is associated with the particle type 254 "swirl," and the flow particle 250(500) is associated with the particle type 254 "smoke." In alternate embodiments, the energy brushes 150 may generate any number of flow particles 250 that are associated with any number of particle types 254 in any combination.

Each of the flow particles 250 is associated with a position and a velocity field 350. In operation, to generate and/or update a given flow particle 250, the dynamic effects engine 160 computes a position and a velocity field 350. The dynamic effects engine 160 computes the position based on any number of a previous position, the time step, the interval parameter 262 included in the associated energy brush 150, and the speed parameter 268 included in the associated energy brush 150.

The dynamic effects engine 160 represents the velocity field 350 as a normalized local velocity field (not shown) that is associated with tunable parameters that control the size and the strength of the velocity field 350. The dynamic effects engine 160 computes the strength and size of the velocity field 350 based on, respectively, the strength parameter 266 and the size parameter 268 included in the associated energy brush 150. The dynamic effects engine 160 defines the normalized velocity field based on the associated particle type 254, and centers the normalized velocity field at the position of the flow particle 250.

In general, for each of the flow particles 250 that are associated with the particle type 254 "wind," the dynamic effects engine 160 computes the velocity field 350 that moves in a specified direction. More precisely, for the flow particle 250(1) the dynamic effects engine 160 computes the velocity field 350(1) based on a normalized velocity field $f_{wind}$:

$$f_{wind}(x, y) = (1-r)\begin{bmatrix} 0 \\ 1 \end{bmatrix} \quad (1)$$

In the equation (1), r is the distance from the position of the flow particle 250. Accordingly, the equation (1) establishes the velocity field 350 along an upward direction that fades outwards.

By contrast, for each of the flow particles 250 that are associated with the particle type 254 "swirl," the dynamic effects engine 160 computes the velocity field 350 that moves in a rotational direction. More precisely, for the flow particle 250(115), the dynamic effects engine 160 computes the velocity field 350(115) based on a normalized velocity field $f_{swirl}$:

$$f_{swirl}(x, y) = (-1)^v \frac{1-r}{r}\begin{bmatrix} y \\ -x \end{bmatrix} \quad (2)$$

In the equation (2), v is a parameter that controls the rotation direction, Accordingly, the equation (2) establishes a rotational velocity field 350 that fades outwards.

For each of the flow particles 250 that are associated with the particle type 254 "smoke," the dynamic effects engine 160 computes the velocity field 350 that corresponds to an up-rising smoke-like motion. More precisely, for the flow particle 250(500), the dynamic effects engine 160 computes the velocity field 350(500) based on a normalized velocity field $f_{smoke}$:

$$f_{smoke}(x, y) = \phi(r)\begin{bmatrix} 0 \\ 1 \end{bmatrix} \quad (3)$$

$$\text{where } \phi(r) = (\nabla \nabla^T - \nabla^2 I)e^{-r^2}, \quad (4)$$

$$\text{and } \nabla = \begin{bmatrix} \partial/\partial x \\ \partial/\partial y \end{bmatrix} \quad (5)$$

In the equations (3), (4), and (5), $\nabla$ is the gradient operator, $\nabla^2$ is the Laplacian operator, $\nabla\nabla^T$ is the Hessian operator, and I is the 2×2 identity matrix.

In general, the dynamic effects engine 160 may compute and represent the velocity fields 350 in any technically feasible fashion. For instance, in alternate embodiments, the dynamic effects engine 160 may represent the velocity fields 350 based on velocity grids. In such embodiments, each of the flow particles 250 is located substantially at a center of a velocity grid. As referred to herein, a given flow particle 250 is "located substantially" at a center of the velocity grid when a location of the flow particle 250 lies within a predetermined acceptable error tolerance of the center of the velocity grid.

In various embodiments, the dynamic effects engine 160 and the dynamic effects GUI 130 may include any number of predefined particle types 254. In alternate embodiments, the dynamic effects engine 160 and the dynamic effects GUI 130 may enable animators to specify customized particle types 254. The customized particle types 254 allow the animators to specify any number and type of patterns for the velocity fields 350 of associated flow particles 250. Notably, in some embodiments, the animators may specify time-varying patterns for the velocity fields 350.

Animating Strokes

FIGS. 4A-4D illustrate a sequence of operations performed by the dynamic effects engine 160 of FIG. 1 when computing how the flow particles 250 influence the stroke 160, according to various embodiments of the present invention. In alternate embodiments, the dynamic effects engine 160 may perform any number of animation operations to compute the influence of any number of the flow particles 250 associated with any number of the energy brushes 150 on the strokes 140.

Figure 4A:
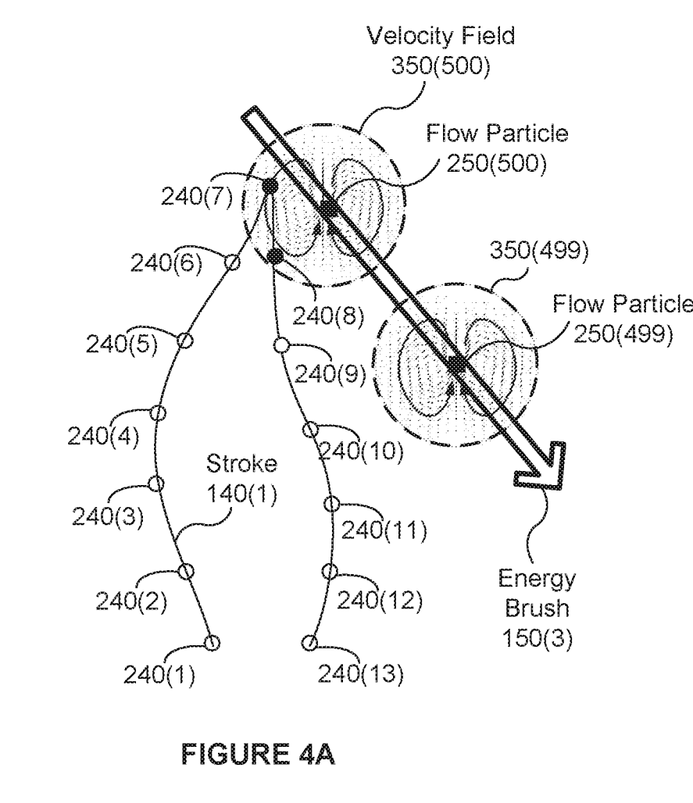
FIGS. 4A-4D illustrate a sequence of operations performed by the dynamic effects engine of FIG. 1 when computing how flow particles influence a stroke, according to various embodiments of the present invention.

FIG. 4A depicts the stroke 140(1) as the stroke 140(1) appears in a first frame. As shown, the dynamic effects engine 160 performs sampling operations to compute the samples 240 that are included in the stroke 140(1). Further, for each of the energy brushes 150, the dynamic effects engine 160 generates, discards, and/or updates the associated flow particles 250 based on the coarse direction 252, the parameters 260, and the time step.

More specifically, for a given flow particle 250, the dynamic effects engine 160 updates the position of the flow particle 250 to simulate the motion of the flow particle 250 along the energy brush 150 as the energy brush 150 continuously generates the flow particles 250. In a complementary fashion, for the flow particle 250, the dynamic effects engine 160 generates the velocity field 350 that is associated with the flow particle 250. Notably, the dynamic effects engine 160 determines the pattern of the velocity field 350 based on the particle type 254 associated with the energy brush 150.

As depicted for the energy brush 150(3), the dynamic effects engine 160 generates the flow particle 250(500) and moves the existing flow particle 250(499) along the energy brush 150(3). Further, although not shown, the dynamic effects engine 160 discards the flow particle 250(498). As described previously herein, after computing the positions of the flow particles 250, the dynamic effects engine 160 computes the velocity fields 350(500) and 350(499) that are associated with, respectively, the flow particle 250(500) and the flow particle 250(499).

For each of the samples 240, the dynamic effects engine 160 initializes an accumulated velocity (not shown) that is associated with the sample 240 to zero. The accumulated velocity that is associated with a given sample 240 represents a sum of the influences of all the flow particles 250 on the sample 240. Subsequently, the dynamic effect engines 160 iterates through all of the flow particles 250 included in all of the energy brushes 150. For each of the flow particles 250, the dynamic effects engine 160 iterates through all of the samples 240 included in all of the strokes 140.

For a given flow particle 250(x) and a given sample 240(y), the dynamic effects engine 160 determines whether the position of the sample 240(y) lies within the velocity field 350(x) associated with the flow particle 250(x) based on the size of the velocity field 350(x). If the position of the sample 240(y) does not lie within the velocity field 350(x), then the dynamic effects engine 160 continues to iterate without updating the accumulated velocity associated with the sample 240(y). However, if the position of the sample 240(y) lies within the velocity field 350(x), then the dynamic effects engine 160 updates the accumulated velocity associated with the sample 240(y) to reflect the influence of the flow particle 250(x).

More specifically, the dynamic effects engine 160 maps the sample 240(y) to the normalized velocity field associated with the flow particle 250(x) to compute a normalized velocity that is associated with the flow particle 250(x) and the sample 240(y). The dynamic effects engine 160 then multiplies the normalized velocity and the strength associated with the flow particle 250(x) to compute the velocity that is associated with the flow particle 250(x) and the sample 240(y). As persons skilled in the art will recognize, the velocity that is associated with the flow particle 250(x) and the sample 240(y) represents the influence of the flow particle 250(x) on the sample 240(y). The dynamic effects engine 160 then adds the velocity that is associated with the flow particle 250(x) and the sample 240(y) to the accumulated velocity that is associated with the sample 240(y).

As shown, the samples 240(7) and 240(8) lie within the velocity field 350(500), and none of the samples 240 lie within the velocity field 350(499). Consequently, as depicted with the hollow circles, the dynamic effects engine 160 computes the accumulated velocity of zero for the samples 240(1)-240(6) and for the samples 240(8)-240(13). By contrast, as depicted with the filled circles, the dynamic effects engine 160 computes non-zero accumulated velocities for the samples 240(7) and 240(8).

Figure 4B:
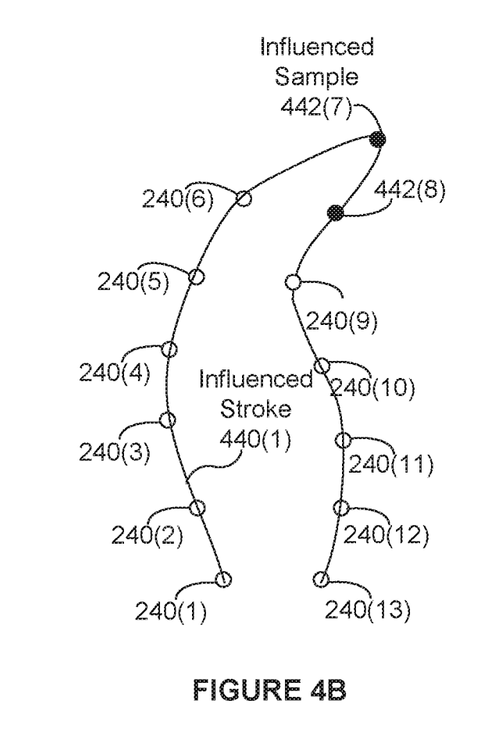

As shown in FIG. 4B, after the dynamic effects engine 160 computes the accumulated velocities, the dynamic effects engine 160 computes influenced strokes 440 that reflect the influences of the flow particles 250 on the strokes 140. As shown, each of the influenced strokes 140 includes the samples 240 that are not influenced by any of the flow particles 250 and influenced samples 442 that reflect movements of the samples 240 that are attributable to the influence of the flow particles 250. In general, the dynamic effects engine 160 computes the position of a given influenced sample 442 based on the accumulated velocity that is associated with the corresponding sample 240 and the position of the corresponding sample 240. More precisely, the dynamic effects engine 160 multiplies the accumulated velocity that is associated with the sample 240 and the time step to compute a position change. The dynamic effect engine 160 then adds the position change to the position of the sample 240 included in the stroke 140 to compute the position of the influenced sample 442 included in the influenced stroke 440.

Because the sample 240(7) is influenced by the flow particle 250(500), the position of the corresponding influenced sample 442(7) is downwards and to the right of the position of the sample 240(7). Similarly, because the sample 240(8) is influenced by the flow particle 250(500), the position of the influenced sample 442(8) is downwards and to the right of the position of the sample 240(8). Further, because the samples 240(1)-240(6) and the samples 240(8)-240(13) are not influenced by any of the flow particles 250, the influenced stroke 440 includes the samples 240(1)-240(6) and the samples 240(8)-240(13). Consequently, as shown, the bottom portion of the influenced stroke 440(1) matches the bottom portion of the stroke 140(1).

Figure 4C:
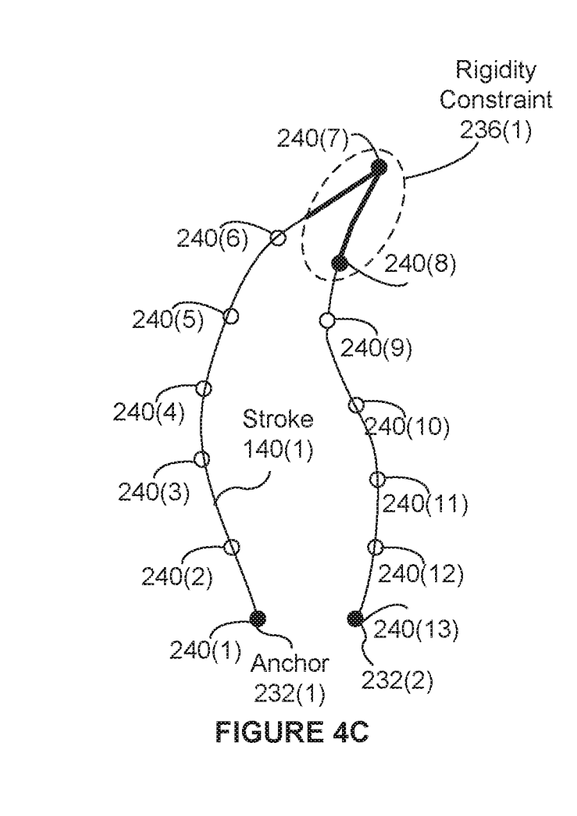

Subsequently, as depicted in FIG. 4C, for each of the strokes 140, the dynamic effects engine 160 updates the positions of the samples 240 based on the positions of the influenced samples 442 and the constraints 230. More specifically, for each of the strokes 140, the dynamic effects engine 160 determines whether the corresponding influenced stroke 440 complies with the constraints 230 associated with the stroke 140. If the corresponding influenced stroke 440 does not comply with the constraints 230, then the dynamic effects engine 160 updates the position of the influenced samples 442 to comply with the constraints 230. In this fashion, the dynamic effects engine 160 modifies the influenced stroke 440 to comply with the constraints 230. After the dynamic effects engine 160 has ensured that the influenced stroke 440 complies with the constraints 230, the dynamic effects engine 160 sets the stroke 140 equal to the corresponding influenced stroke 440.

As shown, the samples 240(7) and 240(8) are associated with the rigidity constraint 236(1). Further, the position of the influenced samples 442(7) and 442(8) deform the influenced stroke 440(1) beyond a limit specified by the rigidity constraint 236(1). Consequently, the dynamic effects engine 160 moves the influenced samples 442(7) and 442(8) "backwards" towards the positions of the other samples 240 included in the stroke 140. In general, the dynamic effects engine 160 may implement and enforce any number and type of constraints 236 in any technically feasible fashion. For instance, in some embodiments, if any of the samples 240 is specified as one of the anchors 232, then the dynamic effect engine 160 does not compute the corresponding influenced sample 442 and, consequently, does not backwardly adjust the influenced sample 442.

As persons skilled in the art will recognize, if a given stroke 140 has no or only weak stretch constraints 234 (e.g., a smoke filament), the distance between adjacent samples 240 may become highly non-uniform after the dynamic effects engine 160 updates the positions of the samples 240. Consequently, to ensure that the stroke 140 is able to capture the detailed dynamics in the "over-streched" region between the adjacent samples 240, the dynamic effects engine 160 performs resampling operations.

Figure 4D:
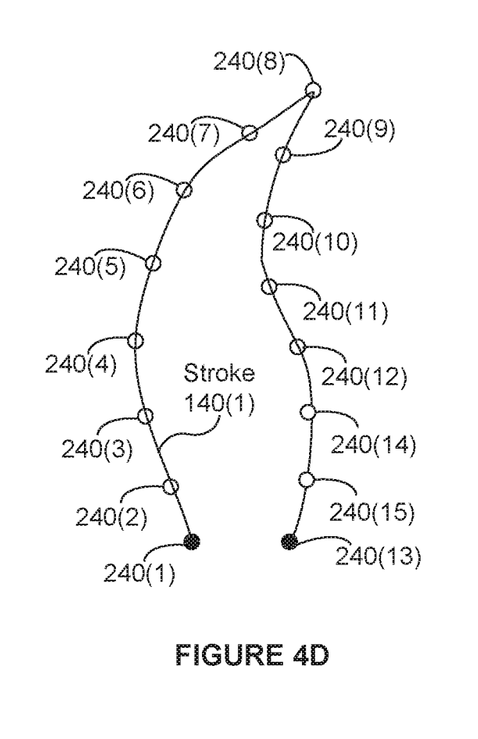

The resampling operations may include any number and combination of creating new samples 240, discarding existing samples 240, changing the positions of the samples 240, re-triangulating the stroke 140, and so forth. As shown in FIG. 4D, after the dynamic effects engine 160 performs resampling operations, the stroke 140 includes two additional samples 240. However, the dynamic effects engine 160 does not modify the samples 240(1) and 240(13) that are associated with the anchors 232.

After updating each of the strokes 140 to reflect the applied energies specified by the energy brushes 150, the dynamic effects engine 160 updates the dynamic effects GUI 130 to display a new frame that includes the updated strokes 140. In alternate embodiments, the dynamic effects engine 160 may perform any number and type of operations that update the strokes 140 to reflect the influences of the energy brushes 150 and the flow particles 250.

Figure 5:
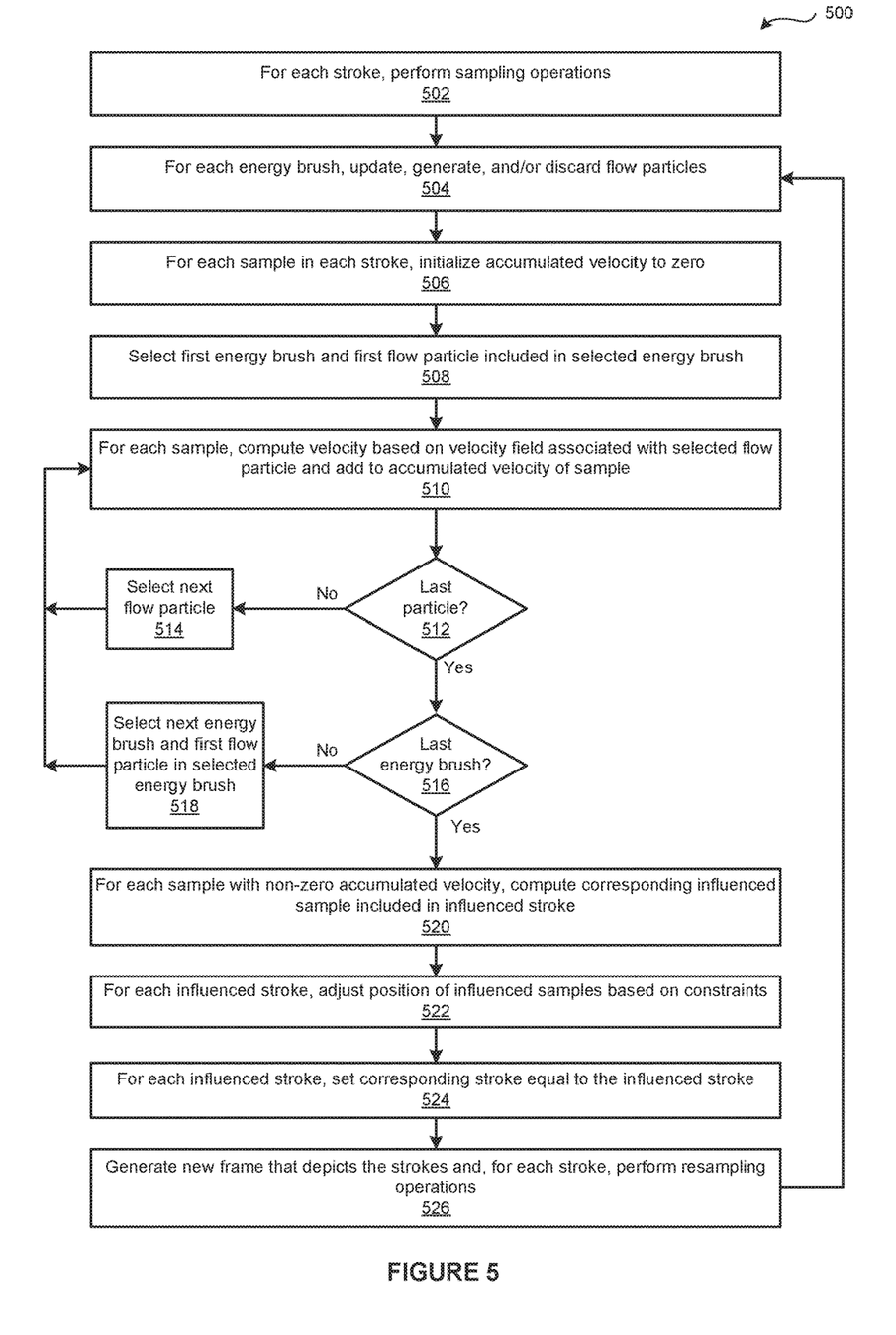
FIG. 5 is a flow diagram of method steps for generating a dynamic effects animation, according to various embodiments of the present invention.

FIG. 5 is a flow diagram of method steps for generating a dynamic effects animation, according to various embodiments of the present invention. Although the method steps are described with reference to the systems of FIGS. 1-4, persons skilled in the art will understand that any system configured to implement the method steps, in any order, falls within the scope of the present invention.

As shown, a method 500 begins at step 502, where for each of the strokes 140, the dynamic effects engine 160 performs sampling operations to compute the samples 240 that are included in the stroke 140. At step 504, for each of the energy brushes 150, the dynamic effects engine 160 updates, generates, and/or discards the associated flow particles 140 based on the coarse direction 252, the parameters 260, and the time step. More specifically, for a given flow particle 250, the dynamic effects engine 160 updates the position of the flow particle 250 and computes the velocity field 350 associated with the flow particle 250. Notably, the dynamic effects engine 160 determines the pattern of the velocity field 350 based on the particle type 254 associated with the energy brush 150.

At step 506, for each of the samples 240 included in each of the strokes 140, the dynamic effects engine 160 initializes an accumulated velocity that is associated with the sample 240 to zero. At step 508, the dynamic effects engine 160 selects the first energy brush 150 and then selects the first flow particle 250 that is included in the selected energy brush 150. At step 510, for each of the samples 240 included in each of the strokes 140, the dynamic effects engine 160 computes a velocity based on the velocity field 350 that is associated with the selected flow particle 250 and adds the velocity to the accumulated velocity that is associated with the sample 240. If a given sample 240 lies outside the velocity field 350 associated with the selected flow particle 250, then the dynamic effects engine 160 does not modify the accumulated velocity.

At step 512, the dynamic effects engine 160 determines whether the selected flow particle 250 is that last flow particle 250 that is included in the selected energy brush 150. If, at step 512, the dynamic effects engine 160 determines that the selected flow particle 250 is not the last flow particle 250 that is included in the selected energy brush 150, then the dynamic effects engine 160 proceeds to step 514. At step 514, the dynamic effects engine 160 selects the next flow particle 250 that is included in the selected energy brush 150. The method 500 then returns to step 510, where the dynamic effects engine 160 updates the accumulated velocities of the samples 240 to reflect the influence of the newly selected flow particle 250.

If, however, at step 512, the dynamic effects engine 160 determines that the selected flow particle 250 is the last flow particle 250 that is included in the selected energy brush 150, then the method 500 proceeds directly to step 516. At step 516, the dynamic effects engine 160 determines whether the selected energy brush 150 is the last energy brush 150. If, at step 516, the dynamic effects engine 160 determines that the selected energy brush 150 is not the last energy brush 150, then the dynamic effects engine 160 proceeds to step 518. At step 518, the dynamic effects engine 160 selects the next energy brush 150 and selects the first flow particle 250 included in the selected energy brush 150. The method 500 then returns to step 510, where the dynamic effects engine 160 updates the accumulated velocities of the samples 240 to reflect the influence of the newly selected flow particle 250.

If, however, at step 516, the dynamic effects engine 160 determines that the selected energy brush 150 is the last energy brush 150, then the dynamic effects engine 160 proceeds directly to step 520. At step 520, the dynamic effects engine 160 computes the influenced strokes 440 that reflect the influences of the flow particles 250 on the corresponding strokes 140. Each of the influenced strokes 440 includes the samples 240 that are not influenced by any of the flow particles 250 and the influenced samples 442 that reflect movements of the samples 240 that are attributable to the influence of the flow particles 250. In general, the dynamic effects engine 160 computes the position of the influenced sample 442($i$) based on the accumulated velocity that is associated with the sample 240($i$) and the position of the sample 240($i$).

At step 522, for each of the influenced strokes 440, the dynamic effects engine 160 adjusts the positions of the influenced samples 442 that are included in the influenced stroke 440 based on the constraints 236 that are associated with the corresponding stroke 140. The dynamic effects engine 160 may implement and enforce any number and type of the constraints 230 in any technically feasible fashion. For instance, the dynamic effects engine 160 may implement anchors 232, stretch constraints 234, and rigidity constraints 236, to name a few. In various embodiments, the dynamic effects engine 160 may adapt any of the method steps to reflect one or more of the constraints 230. For instance, in some embodiments, if a particular sample 240 is associated with the anchor 232, then the dynamic effects engine 160 may not compute the corresponding influenced sample 442 (step 520).

At step 524, for each of the influenced strokes 440, the dynamic effects engine 160 sets the corresponding stroke 140 equal to the influenced stroke 440. In this fashion the dynamic effects engine 160 deforms the strokes 140 to reflect the influences of the flow particles 250 while enforcing any constraints 236. At step 526, the dynamic effects engine 160 generates a new frame that includes the deformed strokes 140. Further, for each of the strokes 140, to ensure that the stroke 140 is able to capture the detailed dynamics between the adjacent samples 240, the dynamic effects engine 160 performs resampling operations to generate new samples 240 for the stroke 140. The method 500 then returns to step 504, where the dynamic effects engine 160 generates a new frame that reflects the influences of the energy brushes 150 and the flow particles 250 on the strokes 140 during a time step between the frames.

In sum, the disclosed techniques enable an animator to automatically generate a dynamic effects animation. A dynamic effects animation subsystem includes a dynamic effects GUI and a dynamic effects engine. First, the animator inputs strokes (i.e., groups of points that represent a line, solid filled region, etc.) that define 2D graphical objects via the GUI. To interactively design dynamic effects, the animator then sketches energy brushes via the GUI. Each energy brush defines the overall direction of an applied energy and continuously emits flow particles. Each flow particle generates an energy pattern that is represented as a velocity field surrounding the flow particle. To generate each frame, the dynamic effects engine moves the flow particles along the associated energy brushes and deforms strokes that lie within the velocity fields to reflect the influence of the applied energies. The GUI sequentially displays the frames to generate the dynamic effects animation.

Advantageously, the dynamic effects subsystem provides artistic control while reducing the time and expertise required to generate the dynamic effects animation. More specifically, the combination of the energy brushes and the flow particles allows the animator to understand and control the applied energies that impact the strokes at both a coarse scale and a fine scale. Further, the dynamic effects engine automatically updates the strokes based on the movement of the flow particles to generate the dynamic effects animation. Consequently, the time and expertise required to produce a realistic dynamic effects animation is dramatically less than the time and expertise that would be required to perform key framing.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating a dynamic effects animation, the method comprising:
   computing a first velocity field for a first flow particle based on an applied energy, wherein the first velocity field has a first radius;
   computing a first velocity of a first sample included within a first graphical object based on whether the first sample lies within the first radius of the first velocity field and based on a position of the first sample, wherein the first graphical object is included in a first frame;
   updating the position of the first sample based on the first velocity to generate a second graphical object; and
   generating a second frame that includes the second graphical object.

2. The computer-implemented method of claim 1, wherein computing the first velocity field comprises:
   computing a position of the first flow particle based on one or more of an overall direction, an interval parameter, and a speed parameter; and
   computing the first velocity field based on the position of the first flow particle and one or more of a flow particle type, a strength parameter, and a size parameter.

3. The computer-implemented method of claim 2, wherein one or more of the overall direction, the interval parameter, the speed parameter, the flow particle type, the strength parameter, and the size parameter are derived from applying an energy brush to the first frame.

4. The computer-implemented method of claim 1, further comprising:
   performing one or more resampling operations to generate a second sample included within the second graphical object;
   computing a second velocity field for the first flow particle according to how the applied energy causes the first flow particle to move;
   updating a position of the second sample based on the second velocity field to generate a third graphical object; and
   generating a third frame that includes the third graphical object.

5. The computer-implemented method of claim 1, wherein updating the position of the first sample comprises:
   computing a second position based on the first velocity and the position of the first sample;
   determining that the second position does not comply with a constraint associated with the first graphical object;
   computing a third position based on the second position and the constraint; and
   setting the position of the first sample equal to the third position.

6. The computer-implemented method of claim 5, wherein the constraint comprises one of an anchor constraint, a stretch constraint, and a rigidity constraint.

7. The computer-implemented method of claim 1, wherein updating the position of the first sample comprises:
   performing one or more summation operations between an intermediate velocity and the first velocity to generate an accumulated velocity of the first sample, wherein the intermediate velocity reflects at least a second velocity of the first sample that is derived based on applying a second flow particle to the first sample;
   computing a second position based on the accumulated velocity and the position of the first sample; and
   setting the position of the first sample equal to the second position.

8. The computer-implemented method of claim 1, wherein a pattern corresponding to the first velocity field represents wind, a swirl, or smoke.

9. The computer-implemented method of claim 1, wherein a pattern corresponding to the first velocity field varies over time.

10. The computer-implemented method of claim 1, wherein the first graphical object comprises an outline of a shape, a region that is filled with a solid color, or a texture.

11. One or more non-transitory computer-readable storage media including instructions that, when executed by one or more processing units, cause the one or more processing units to generate a dynamic effects animation by performing the steps of:
    computing a first velocity field for a first flow particle based on a first applied energy, wherein the first velocity field has a first radius;
    computing a first velocity of a first sample included within a first graphical object based on whether the first sample lies within the first radius of the first velocity field and based on a position of the first sample, wherein the first graphical object is included in a first frame;
    updating the position of the first sample based on the first velocity to generate a second graphical object; and
    generating a second frame that includes the second graphical object.

12. The one or more computer-readable storage media of claim 11, wherein computing the first velocity field comprises:
    computing a position of the first flow particle based on one or more of an overall direction, an interval parameter, and a speed parameter; and
    computing the first velocity field based on the position of the first flow particle and one or more of a flow particle type, a strength parameter, and a size parameter.

13. The one or more computer-readable storage media of claim 12, wherein one or more of the overall direction, the interval parameter, the speed parameter, the flow particle type, the strength parameter, and the size parameter are derived from applying an energy brush to the first frame.

14. The one or more computer-readable storage media of claim 11, further comprising:
    performing one or more resampling operations to generate a second sample included within the second graphical object;
    computing a second velocity field for the first flow particle according to how the first applied energy causes the first flow particle to move;
    updating a position of the second sample based on the second velocity field to generate a third graphical object; and
    generating a third frame that includes the third graphical object.

15. The one or more computer-readable storage media of claim 11, wherein updating the position of the first sample comprises:
    computing a second position based on the first velocity and the position of the first sample;
    determining that the second position does not comply with a constraint associated with the first graphical object;
    computing a third position based on the second position and the constraint; and setting the position of the first sample equal to the third position.

16. The one or more computer-readable storage media of claim 11, wherein updating the position of the first sample comprises:
   computing a second velocity field for a second flow particle based on a second applied energy;
   computing a second velocity of the first sample based on the second velocity field and the position of the first sample;
   performing one or more summation operations between the first velocity and the second velocity to generate an accumulated velocity of the first sample;
   computing a second position based on the accumulated velocity and the position of the first sample; and
   setting the position of the first sample equal to the second position.

17. The one or more computer-readable storage media of claim 11, wherein a pattern corresponding to the first velocity field represents wind, a swirl, or smoke.

18. The one or more computer-readable storage media of claim 11, wherein the first velocity field comprises a grid of velocities, and the first flow particle is located substantially at a center of the grid of velocities.

19. The one or more computer-readable storage media of claim 11, further comprising, prior to computing the first velocity, performing one or more sampling operations on the first graphical object to generate the first sample.

20. A system comprising:
   a memory storing a dynamic effects engine; and
   a processor that is coupled to the memory and, when executing the dynamic effects engine, is configured to:
      compute a first velocity field for a first flow particle based on an applied energy, wherein the first velocity field has a first radius;
      compute a first velocity of a first sample included within a first graphical object based on whether the first sample lies within the first radius of the first velocity field and based on a position of the first sample, wherein the first graphical object is included in a first frame;
      update the position of the first sample based on the first velocity to generate a second graphical object; and
      generate a second frame that includes the second graphical object.

21. The method of claim 1, wherein the applied energy includes a direction, and wherein the first flow particle moves along the direction.

22. The one or more computer-readable storage media of claim 11, wherein the first graphical object comprises a plurality of samples, and further comprising, for each sample included in the plurality of samples, computing a corresponding velocity for the sample based on whether the sample lies within the first radius of the first velocity field and based on a position of the sample.

* * * * *